United States Patent [19]

Kubinski

[11] 4,163,685
[45] Aug. 7, 1979

[54] APPLICATION OF SIDEWALL TO A TIRE CARCASS

[75] Inventor: Donald C. Kubinski, Wadsworth, Ohio

[73] Assignee: The Goodyear Tire & Rubber Company, Akron, Ohio

[21] Appl. No.: 889,457

[22] Filed: Mar. 23, 1978

[51] Int. Cl.² .......................................... B29H 17/18
[52] U.S. Cl. ............................ 156/405 R; 156/421; 226/158
[58] Field of Search ............... 156/111, 116, 394, 396, 156/405, 406, 412, 421; 226/120, 124, 127–129, 147, 149, 158

[56] References Cited

U.S. PATENT DOCUMENTS

| | | | |
|---|---|---|---|
| 2,471,140 | 5/1949 | Breth | 156/405 |
| 2,600,291 | 6/1952 | Engler | 156/412 |
| 2,614,456 | 10/1952 | Zeuthen | 226/158 |
| 3,411,975 | 11/1968 | Rowe | 156/405 |
| 3,413,174 | 11/1968 | Porter | 156/405 |
| 3,595,724 | 7/1971 | Leblond | 156/405 |
| 3,728,181 | 4/1973 | Simmons | 156/96 |
| 3,944,457 | 3/1976 | Podvin et al. | 156/405 |
| 4,019,945 | 4/1977 | Look et al. | 156/405 |
| 4,052,246 | 10/1977 | Albareda et al. | 156/421 |

*Primary Examiner*—John E. Kittle
*Attorney, Agent, or Firm*—R. S. Washburn

[57] ABSTRACT

A simple practical space saving device applies sidewall to a tire carcass on a building drum and cuts off the appropriate length from a supply of sidewall stock at an acute angle. A carrier has fingers supporting the leading end of the sidewall which fingers move a short horizontal distance from the site of a previous cut to a nip formed between an application roll surface and the carcass. The fingers are each accommodated in an annular slot in the application roll surface. This abstract is not to be taken as limiting the invention of this application, and in order to understand the full nature and extent of the technical disclosure of this application, reference must be made to the accompanying drawings and the following detailed description.

6 Claims, 2 Drawing Figures

APPLICATION OF SIDEWALL TO A TIRE CARCASS

The present invention relates to the manufacture of tires and particularly to a device for applying uncured gum sidewall directly on a tire carcass which is supported on a building drum rotatable about a drum axis.

The device according to the invention is particularly useful in connection with a tire building apparatus wherein a plurality of tire building drums successively occupy spaced building stations, certain components of the tire being built being applied at selected ones of said stations.

The principal object of the invention is an improved apparatus for applying sidewall to a tire carcass.

The foregoing object and other objects which will become apparent from the following description are accomplished in accordance with the invention by a device for applying uncured gum sidewall directly on a tire carcass supported on a building drum rotatable about a drum axis, the device comprising a frame, roll means providing a cylindrical application surface rotatable about a roll axis parallel to said drum axis in response to rotation of said drum, said cylindrical application surface having a first axial portion provided by a plurality of annular discs spaced coaxially to provide annular slots therebetween and a second axial portion coaxially adjacent said first portion provided by a plurality of annular discs of equal diameter and of lesser axial thickness disposed in side-by-side contact coaxially of said roll axis, said drum axis and said roll axis defining a first reference plane, carrier means mounted on said frame for reciprocable movement parallel to a second reference plane which is perpendicular to said first reference plane and tangent to said cylindrical application surface, and air cylinder means mounted on said frame and connected to said carrier means to effect said reciprocating movement, said carrier means including a sub-frame having a sidewall supporting surface parallel to said second reference plane, at least part of said supporting surface comprising a plurality of fingers respectively aligned parallel to said direction of reciprocating movement and respectively aligned with said annular slots, and cutoff means mounted on said frame operable to cut off a length of sidewall being wrapped about said carcass from a running length supply thereof at an acute angle with respect to said second reference plane, said cutoff means being mounted to effect such cutoff at a distance from said cylindrical application surface which is less than one-quarter of the circumference of said carcass.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

Figure 1:
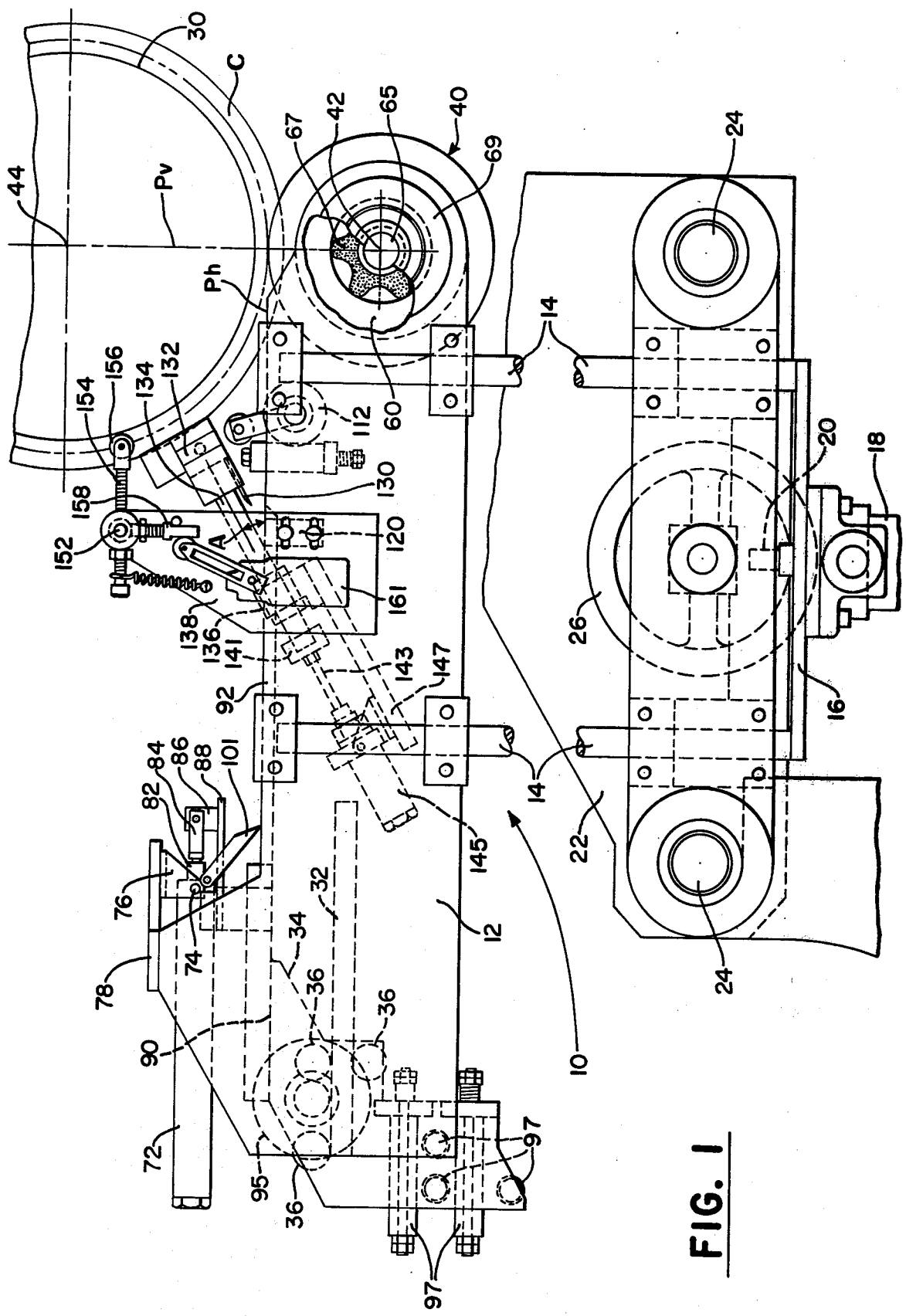
FIG. 1 is a view in side elevation of a device in accordance with the invention.

With reference to the drawings, the sidewall applying device 10 has a frame 12 the side members 12a, 12b of which are of rigid plate material spaced apart and parallel each other. To lift the device to its sidewall applying position the frame is supported by a plurality of lift rods 14 affixed by clamp brackets 15 which are secured to the respective side members. The lift rods are connected at their lower ends to a plate 16 to which a lifting cylinder 18 is affixed. The piston rod 20 of the lifting cylinder is secured to a base support 22 which is carried by a parallel pair of fixed base support beams 24 through which the lift rods extend vertically upward from the plate. By manipulation of the hand wheel 26, the base support can be moved toward and away from the viewer of FIG. 1 along the support beams to locate the device 10 with respect to a tire carcass C on a building drum 30. The lift cylinder provides lifting means by which the frame can be moved relative to the fixed base support beams and the base support.

The frame side members each have a fixed rail 32 on which a subframe 34 is mounted for reciprocating movement guided by the plurality of stub rollers 36 which roll on the rails.

Roll means mounted on the frame provide a cylindrical application surface 40 which is rotatable about a roll axis 42.

For convenience in description, the roll axis 42 and the drum axis 44 of the tire building drum 30 with which the device cooperates are considered to define a first reference plane Pv. A second reference plane Ph is considered to extend perpendicularly of the first reference plane and tangent to the cylindrical application surface 40.

The cylindrical application surface comprises a first axial portion 50 and a second axial portion 52. The first portion comprises a plurality of annular discs 54 which are spaced axially by spacers 56 disposed between adjacent pairs of the discs 54 so as to provide a plurality of spaced annular slots 58. The second annular portion 52, which is coaxially adjacent to the first portion, comprises a plurality of annular discs 60 which are of the same diameter as, but thinner, axially than the discs of the first axial portion, being conveniently one-half the thickness of the first mentioned discs. The discs of the second axial portion are disposed coaxially and in face-to-face contact or side-to-side contact without annular grooves therebetween.

The discs are mounted coaxially of the shaft 65 which has a resiliently yieldable elastomeric sleeve 67 disposed coaxially of the shaft and on which the discs are mounted so as to be radially yieldable but free of axial displacement. The elastomeric sleeve has a cross-section normal to the shaft the periphery of which section is star-shaped, that is, has a plurality of equally spaced lobes. The shape of the cross-section is provided by a plurality of ridges and grooves alternated circumferentially and which ridges and grooves extend longitudinally of the sleeve between the retaining collars 69 which position the discs on the shaft.

The lift cylinder 18, as will be apparent in FIG. 1, moves the device 10 in directions parallel to the first reference plane Pv away from the building drum and alternately to the building drum to a sidewall transfer position for transferring sidewall directly from the cylindrical applying surface 40 to a tire carcass C being built on the drum 30.

To advance sidewall to be applied to a carcass on the building drum in position shown in FIG. 1, the previously mentioned subframe 34 is moved forward parallel to the second reference plane Ph by actuation of the air cylinder 72 which is mounted on trunnions 74 supported in the brackets 76 which are fixed in the top plate 78 of the frame 12. The piston rod 82 is attached by a clevis 84 to a post 86 fixed in the plate 88 extending across the subframe 34 which plate is secured to a plate secured to a sidewall supporting surface 90 parallel to the second reference plane Ph. Forming a coplanar part of the supporting surface 90, are a plurality of fingers, for example, the three fingers shown in FIG. 2, which are attached to and extend forward from the subframe. The fingers are parallel to each other and are respectively aligned with the annular slots 58 provided in the first axial portion 50 of the cylindrical application surface 40. The sidewall supporting surface 90 including that part thereof provided by the fingers 92 is parallel to and spaced slightly below, for example, from one to one and one-half millimeters below the reference plane Ph.

To control the approach of the sidewall onto the sidewall supporting surface 90 of the subframe, a turning roll 95 is rotatably mounted on the subframe. A guide channel provided by and between a plurality of stub rollers 97 guides the approach of the sidewall strip from a letoff means (not shown) to and around the turning roll the surface of which is tangent to the sidewall supporting surface.

A simple anti-backing device is mounted on the subframe 34 to permit movement of the sidewall relatively of the subframe toward the cylindrical application surface 40 and to prevent movement of the sidewall relative to the subframe away from said cylindrical surface. The anti-backing device is provided by a sheet metal plate 101 the edges of which are folded normal to the width across the subframe and attached for pivoting movement about the pins 103 carried by the plate 88. The arrangement permits part of the weight of the plate 101 to rest on the sidewall to prevent reverse movement and to permit forward movement with respect to the direction of application of the sidewall to the carcass.

The respective fingers 92 are extended from the subframe 34 of the carrier means and are rollably supported in the respectively associated grooves 110 of a flanged roll 112 mounted on a shaft 114 extending between and affixed to the side members 12a, 12b of the frame.

Figure 2:
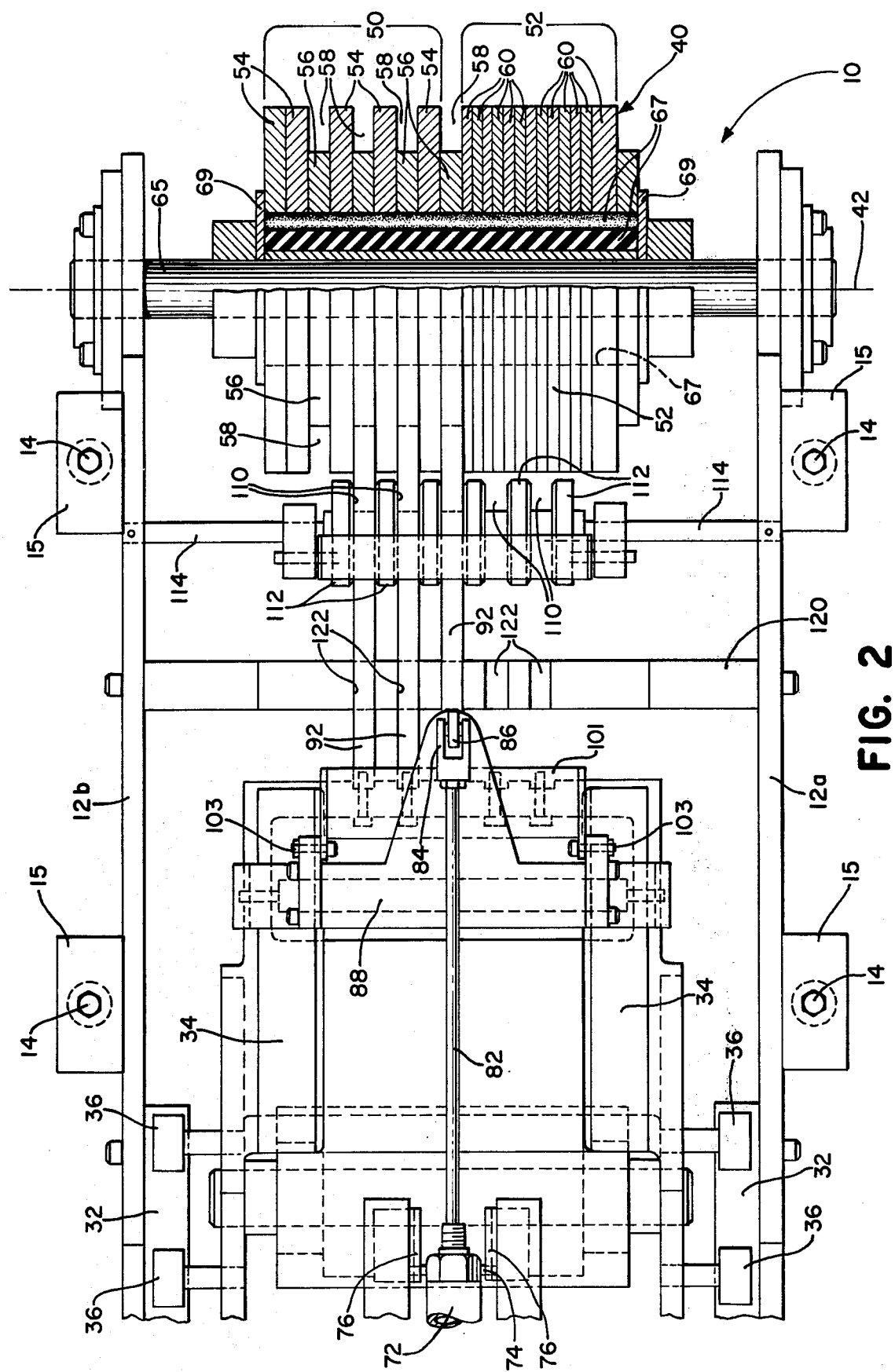
FIG. 2 is a view in top plan of the device of FIG. 1, certain details having been omitted for clarity.

An anvil bar 120 is mounted in the frame 12 to extend parallel to both the first and the second reference planes. The anvil bar has grooves or slots 122 therein which respectively accommodate the fingers 92 so that the top surface of the bar and of the fingers, as seen in FIG. 2, are flush and coplanar. The anvil bar and the fingers cooperate with a cut-off knife presently to be described to sever a length of sidewall, being wrapped about the carcass on the drum, from a running length supply of sidewall material and at an acute angle A with respect to the second reference plane Ph.

To sever the sidewall, the device is provided with cut-off means, which includes the anvil bar, and a knife 130 the cutting edge of which extends parallel to both the first and the second reference plane and which is movable along an acute angle A toward and away from the anvil bar 120 with which it cooperates to sever the sidewall. The knife is mounted on a first cross-member 132 which preferably is provided with suitable means for maintaining the temperature of the knife. The first cross-member is mounted on the respectively associated ends of a pair of slide rods 134 which are slidable in fixtures 136 mounted on a pair of side plates 138 which are fixed on the frame side members. The other ends of the slide rods are connected by a second cross-member 141 to which the piston rod 143 of an operating air cylinder 145 is attached. The operating cylinders are fixed to the side plates by a cross-member 147. Because it is desired that the device 10 occupy a minimum space, as well as to provide for accurate control of the application of the sidewall to the carcass, the anvil bar and the knife are located to cut off the sidewall at a location spaced from the first reference plane which is not greater than one-quarter of the circumference of the carcass to which the sidewall is applied.

To control the operation of the cut-off means, a cross-shaft 152 is mounted rotatably on and extends between the side plates 138. The first arm 154 mounted on the cross-shaft carries a sensing wheel 156 disposed close to the surface of the carcass on the tire building drum 30 so as to be displaced by the leading edge of the sidewall partially wrapped thereon. A second arm 158 fixed on the cross-shaft swings in response to the rotation of the shaft by the sensing wheel to actuate a limit switch 161 mounted on one of the side plates. Actuation of the limit switch in turn actuates the air cylinder 145 to effect the cutoff, the distance between the cutoff and the first reference plane being identical to the arcuate distance from the first reference plane to the leading edge of the sidewall already applied on the carcass at the time the cutoff is made. Continued or resumed rotation of the building drum 30 then winds the sidewall about the carcass C such that the cutoff end of the sidewall can be spliced to the leading end by the cooperation of the building drum 30 and the cylindrical application surface 40.

It will be noted upon inspection of FIG. 2, that the fingers 92 are associated with the first axial portion 50 of the cylindrical application surface and that the fingers 92 move into the annular slots 58 so as to carry a leading edge of the sidewall being applied to the cylindrical surface 40 immediately adjacent the first reference plane Pv. Because the top surface of the fingers, as mentioned, is very slightly below the second reference plane Ph which is tangent to the application surface 40, the portion of the sidewall being applied is slightly elevated from the top surface of the fingers immediately before it is applied to the carcass.

A further portion of the width of the sidewall to be applied is relatively unsupported between the sidewall supporting surface 90 of the subframe and the flanged roll 112. This latter portion of the sidewall is applied directly to the carcass by the second axial portion of the applying surface 40. The resilience of the sleeve 67 as previously mentioned not only accommodates this usually thicker portion of the sidewall but serves to adhere this latter portion of the sidewall to the carcass in that portion thereof adjacent its edge, in which an inextensible bead core is enfolded. This arrangement provides the advantage that the sidewall is applied to the carcass and spliced but adhered thereto in a relatively narrow part of its width, that is, the part applied by the second axial portion of the cylindrical application surface. This arrangement allows the sidewall subsequently to be stitched conventionally so as to insure that air can be progressively eliminated by stitching the sidewall from the portion already adhered by the second axial portion of the application surface and then axially therefrom on the carcass.

It will be observed that the device described is advantageously one of a pair of like devices by which the customary two sidewall strips can be applied in axially spaced relation to the tire carcass. It will also be apparent that such second device not shown in FIG. 2 will be arranged opposite in hand for application of a sidewall to the far side of the tire carcass seen in FIG. 1. The device 10 provided by the invention is shorter in length and requires considerably less space than apparatus heretofore used. The device has the advantage of being driven solely by the tire building drum on which the carcass is disposed; it requires no independent drive to apply the sidewall directly and automatically to the tire carcass.

The reciprocating movement of the carriage means is limited to that amount of stroke necessary to move the previously cut off leading end of a sidewall from its position on the anvil bar to a location immediately adjacent the first reference plane at which the sidewall is drawn into the nip between the applying surface and the carcass. The subframe can then be returned to its rearward limit as seen in FIG. 1 while the sidewall continues to be wrapped about the carcass on the drum in response to the rotation of the drum, the running length of sidewall being pulled by the corotation over the turning roll through the guide channel from the letoff means (not shown). The movement of the carriage means is such that the ends of the fingers when retracted reside in the slots of the anvil bar and when extended reside in the annular slots of the roll means.

While certain representative embodiments and details have been shown for the purpose of illustrating the invention, it will be apparent to those skilled in the art that various changes and modifications may be made therein without departing from the spirit or scope of the invention.

What is claimed:

1. A device for applying uncured gum sidewall directly on a tire carcass supported on a building drum rotatable about a drum axis, the device comprising a frame, roll means providing a cylindrical application surface rotatable about a roll axis parallel to said drum axis in response to rotation of said drum, said cylindrical application surface having a first axial portion provided by a plurality of annular discs spaced coaxially to provide annular slots therebetween and a second axial portion coaxially adjacent said first portion provided by a plurality of annular discs of equal diameter and of lesser axial thickness disposed in side-by-side contact coaxially of said roll axis, said drum axis and said roll axis defining a first reference plane, carrier means mounted on said frame for reciprocable movement parallel to a second reference plane which is perpendicular to said first reference plane and tangent to said cylindrical application surface, and air cylinder means mounted on said frame and connected to said carrier means to effect said reciprocating movement, said carrier means including a sub-frame having a sidewall supporting surface parallel to said second reference plane, at least part of said supporting surface comprising a plurality of fingers respectively aligned parallel to said direction of reciprocating movement and respectively aligned with said annular slots, and cutoff means mounted on said frame operable to cut off a length of sidewall being wrapped about said carcass from a running length supply thereof at an acute angle with respect to said second reference plane, said cutoff means being mounted to effect such cutoff at a distance from said cylindrical application surface which is less than one-quarter of the circumference of said carcass.

2. A device for applying uncured gum sidewall directly on a tire carcass supported on a building drum rotatable about a drum axis, the device comprising a frame, roll means mounted on said frame and providing cylindrical application surface rotatable about a roll axis parallel to said drum axis in response to rotation of said drum, said roll means comprising a shaft mounted for rotation on said frame, said cylindrical application surface having a first axial portion provided by a plurality of annular discs spaced coaxially of said shaft to provide annular slots therebetween and a second axial portion coaxially adjacent said first portion provided by a plurality of annular discs of lesser axial thickness than and diameters equal to said first plurality of discs disposed in side-by-side contact coaxially of said shaft, said drum axis and said roll axis defining a first reference plane, lift means connected to said frame to move said frame in a direction parallel to said first reference plane away from and to a sidewall transfer position for transferring sidewall from said roll means directly to said carcass, carrier means mounted on said frame for reciprocating movement parallel to a second reference plane which is perpendicular to said first reference plane and tangent to said cylindrical application surface, said carrier means including a sub-frame having a sidewall supporting plane surface parallel to said second reference plane, at least part of said supporting surface comprising a plurality of fingers respectively aligned parallel to the direction of said reciprocating movement and respectively aligned with said annular slots, and air cylinder means mounted on said frame and connected to said sub-frame to effect reciprocating movement of the sub-frame relative to the frame, anti-backing means mounted on said sub-frame for movement toward and away from said sidewall supporting surface to permit movement of sidewall relatively of said sub-frame toward said cylindrical application surface and to prevent movement of said sidewall relatively of said sub-frame away from said cylindrical application surface, and strip guide means mounted on said sub-frame including a freely rotatable turning roll and a plurality of stub rollers defining a guide channel for said sidewall.

3. A device as claimed in claim 2, further comprising cutoff means including an anvil bar fixed in said frame parallel to both said first and said second reference plane said bar having a plurality of slots in which said fingers are respectively slidably supported so that the sidewall support surface and the top of said anvil bar are flush and coplanar and knife operating means mounted on said frame and slidable in a plane oriented at an acute angle with respect to said second reference surface, a single cutting blade supported on said knife operating means and extending parallel to both said first and said second reference plane and movable to engage said anvil bar and said fingers therein thereby to sever said sidewall, and cylinder means connected to said frame and to said knife operating means to effect movement of said blade.

4. A device for applying uncured gum sidewall directly on a tire carcass supported on a building drum rotatable about a drum axis, the device comprising a frame having a parallel pair of spaced apart side plates, roll means mounted in said frame providing a cylindrical application surface rotatable about a roll axis parallel to said drum axis in response to rotation of said drum, said roll means comprising a shaft mounted for rotation on said frame, a resiliently yieldable elastomeric sleeve disposed coaxially on said shaft, and having a cross-section normal to said shaft the periphery of which section is star-shaped, said cylindrical application surface having a first axial portion provided by a plurality of annular discs spaced coaxially of said shaft to provide annular slots disposed alternately between said discs and a second axial portion provided by a plurality of annular discs of lesser axial thickness than the thickness of said first plurality of discs and disposed in side-by-side contact coaxially of said shaft, said drum axis and said roll axis defining a first reference plane, lift means connected to said frame to move said frame in directions parallel to said first reference plane away from and to a sidewall transfer position for transferring sidewall from said roll means directly to said carcass, carrier means mounted on said frame for reciprocating movement parallel to a second reference plane which is perpendicular to said first reference plane and tangent to said cylindrical application surface, and air cylinder means mounted on said frame and connected to said carrier means to effect said reciprocating movement, the length of said movement being less than one-quarter of the circumference of said carcass, said carrier means including a sub-frame having a sidewall supporting surface parallel to said second reference plane at least part of said supporting surface comprising a plurality of fingers respectively aligned parallel to said second reference plane and respectively aligned with said annular slots between respectively adjacent pairs of said first plurality of discs, anti-backing means mounted on said sub-frame to move toward and away from said sidewall supporting surface to permit movement of said sidewall relatively of said sub-frame toward said cylindrical application surface and to prevent movement of said sidewall relatively of said sub-frame away from said cylindrical application surface, and strip guide means mounted on said sub-frame and including a freely rotatable turning roll tangent to said sidewall supporting surface for leading said sidewall to said supporting surface, cutoff means mounted on said frame and operable to cut off said length of sidewall being wrapped about said carcass from a running length supply thereof at an acute angle with respect to said second reference plane, said cutoff means comprising an anvil bar fixed in said frame parallel to both said first and said second reference planes said bar having a plurality of slots in which said fingers are slidably supported so that the sidewall supporting surface and the top of said bar are flush and coplanar, a pair of said plates fixed on said frame, a rod slidably supported in each of said side plates, a first cross member connected to one end of each rod and extending therebetween, a knife fixed on said first cross member, a second cross member connected to the other end of each rod and extending therebetween, a cross shaft mounted rotatably on said side plates and extending therebetween, a first arm mounted on said cross shaft and having a sensing roller engagable with a leading end of said sidewall on said carcass, a second arm mounted on said cross shaft having a pad engagable with a limit switch fixed on one of said plates, and air cylinder means connected to said frame and to said second cross member and operable in response to an actuation of said limit switch to move said knife to contact said anvil bar and said fingers to cut off said sidewall, and a flanged roller mounted in said frame and rotatable about an axis parallel to said first and said second reference plane between said anvil bar and said roll means for rollably supporting said fingers during said reciprocating movement to and from said roll means.

5. A device as claimed in claim 1 and including an elastomeric sleeve disposed about said roll axis for supporting said discs thereabout whereby said discs are resiliently deflectable radially of said roll axis.

6. A device for applying uncured gum sidewall directly on a tire carcass supported on a building drum rotatable about a drum axis, the device comprising a frame, roll means providing a cylindrical application surface rotatable about a roll axis parallel to said drum axis, said cylindrical application surface having a first axial portion provided by a plurality of annular discs spaced coaxially to provide annular slots therebetween and a second axial portion coaxially adjacent said first portion provided by a plurality of annular discs of equal diameter and of lesser axial thickness disposed in side-by-side contact coaxially of said roll axis, said drum axis and said roll axis defining a first reference plane, carrier means mounted on said frame for reciprocable movement parallel to a second reference plane which is perpendicular to said first reference plane and tangent to said cylindrical application surface, said carrier means including a supporting surface parallel to said second reference plane, at least part of said supporting surface comprising a plurality of fingers respectively aligned parallel to said direction of reciprocating movement and respectively aligned with said annular slots.

* * * * *